United States Patent [19]

Borel

[11] Patent Number: 4,676,369
[45] Date of Patent: Jun. 30, 1987

[54] SPIRAL LINK BELT WITH PROTECTED EDGES

[75] Inventor: Georg Borel, Reutlingen, Fed. Rep. of Germany

[73] Assignee: Hermann Wangner GmbH & Co. KG, Reutlingen, Fed. Rep. of Germany

[21] Appl. No.: 819,555

[22] Filed: Jan. 17, 1986

[30] Foreign Application Priority Data

Jan. 22, 1985 [DE] Fed. Rep. of Germany ....... 3501981

[51] Int. Cl.$^4$ .............................................. B65G 17/06
[52] U.S. Cl. ............................ 198/853; 162/DIG. 1;
428/193; 428/222
[58] Field of Search ....................... 198/847, 848, 853;
162/348, DIG. 1; 428/193, 222

[56] References Cited

U.S. PATENT DOCUMENTS

| 660,027 | 10/1900 | Proctor | 198/848 X |
|---|---|---|---|
| 3,523,867 | 8/1970 | MacBean | 162/348 |
| 4,346,138 | 8/1982 | Lefferts | 198/853 X |
| 4,415,625 | 11/1983 | Borel | 162/DIG. 1 |
| 4,505,383 | 3/1985 | Wheeldon et al. | 198/848 X |

FOREIGN PATENT DOCUMENTS

| 52350 | 5/1982 | European Pat. Off. | 162/348 |
|---|---|---|---|
| 3315696 | 10/1984 | Fed. Rep. of Germany | . |
| 707726 | 4/1954 | United Kingdom | 162/DIG. 1 |

Primary Examiner—Jeffrey V. Nase
Attorney, Agent, or Firm—Sughrue, Mion, Zinn, Macpeak, and Seas

[57] ABSTRACT

A spiral link belt for the manufacture of paper has a multiplicity of mutually parallel helices with the windings of successive helices intermeshing in the manner of a zipper, and pintle wires are inserted into the channels formed by the meshing windings. The belt edges are covered by a protective cover consisting of a fabric wrapped about the belt edges and fastened to the spiral link belt. The protective cover can be a double-layer fabric and can have a seven or eight harness weave in which the longitudinal threads pass over four or five transverse threads or pairs of transverse threads.

5 Claims, 5 Drawing Figures

SPIRAL LINK BELT WITH PROTECTED EDGES

BACKGROUND OF THE INVENTION

The present invention is directed to a spiral link belt, e.g. for the production of paper, which is composed of a multiplicity of mutually parallel spirals. The windings of successive spirals mesh with one another in the fashion of a zipper, and pintle wires are inserted through the channels formed by the intermeshing windings to flexibly connect the successive spirals.

Such spiral link belts are known from German Auslegeschrift No. 2,419,751, German Offenlegungsschrift No. 2,938,221, and EP-A-0,018,200. Normally the spirals consist of polyester resin monofilament. The spiral link belts are used as conveyor and filter belts in papermaking machines, predominantly in the drying section where they pass the formed but still moist paper sheet between individual heated drying cylinders thereby urging the sheet against the latter. The contact pressure improves heat transfer to the moist paper sheet and thus also improves the drying effect.

At the high operating speed common in modern papermaking machines from 800 to 1000 m/min, and even higher in some machines, considerable air currents develop within the drying section as air is entrained by the surface of rapidly rotating drying cylinders, and also by the drying screens and drying belts themselves. In the wedge-shaped gap where a drying spiral link belt, for example, runs onto a drying cylinder considerable superatmospheric pressure is built up by said air currents. Since the spiral link belts have a very loose structure, the air passes through the spiral link belts thereby lifting the paper sheet from the spiral link belt so that it starts to flutter and, in extreme cases, may even tear. In order to counteract this adverse effect attempts have been made to fill the interiors of the spirals with additional filament material. The filling consists of monofilament or multifilament threads; see German Offenlegungschriften No. 3,039,873 and 3,135,140 and French Pat. No. 2,494,318.

With the use of drying screens it sometimes happens that, during operation,, screens come in contact with the laterally provided stationary machine parts. As a result, the screen margin is destroyed very soon at the high operating speeds. While the two surfaces of the screen are smooth and consist of helix legs oriented predominantly in the longitudinal direction, the screen edges are rough along both sides. Each edge consists of severed helix wires and of the ends of the transverse pintle wires. This is the reason why the edges are destroyed in a very short time as soon as they chafe along the machine frame. The helices of the belt unwind from the edge inwardly. The same happens, though less rapidly, at the sensor rolls of the belt travel guide. Since the belts are very heavy, the sensors are moved under high pressure until the roll has been returned to the required position by the guide. This too, subjects the margins of the drying belt to very harsh treatment.

In order to overcome these difficulties the margins of the spiral link belts are pasted up. i.e. across a certain width they are filled with a curable synthetic resin composition, as shown in FIG. 7 of EP-A-0,052,350. However, after a long period of use at high temperatures and high humidity the synthetic resin composition grows brittle and crumbles. The synthetic resin composition cannot prevent the destruction of the margins of the drying belt upon contact with the stationary machine parts. As soon as the edge is damaged and opens up, the filler wires inserted into the spirals slide laterally out of the spiral link belt.

In order to remedy this shortcoming EP-A-0,052,350 proposes to insert specially shaped wire loops or wire spirals into the openings of the spirals from the sides. According to FIG. 2 of this publication, the edge is additionally reinforced by a longitudinally extending wire which is retained by the wire loops. The projecting ends of the inserted loops can also be interconnected by a longitudinally extending chain stitch.

This reinforcement of the edge has proved to be only partially helpful because, on account of the very small dimensions of the spaces between the helices the loops cannot be properly formed and inserted, and because the inserted loops are then thrown out of the spiral belt again at the high operating speed. Even if the margin is additionally pasted up with the synthetic resin composition, the loops remain in position only as long as the synthetic resin composition is still intact. The loops then form a reinforcement of the edge within the synthetic resin composition.

From German Offenlegunugsschrift No. 3,315,696, it is known to protect the screen margins by a protective member extending normal to the pintle wires and consisting, for example, of a steel wire or synthetic resin wire passed laterally along the edge and attached to the spiral belt by means of wires.

However, as the spiral link belt chafes against the frame of the machine, the laterally projecting wire loops can be destroyed leaving the protective member unsecured so that it travels along only as long as it is not caught by one of the stationary machine parts. The final tearing of the edge then renders the drying belt useless. In case the edge is additionally embedded into a synthetic resin composition, the resin composition nevertheless is in direct contact with the hot surface of the drying cylinders and is likewise subject to aging.

SUMMARY OF THE INVENTION

It is the object of the invention to provide a spiral link belt whose edges are protected against lateral wear and are stiffened for better actuation of the guide systems.

In order to realize this objective the invention proposes to shield the belt edges by a protective cover consisting of a fabric wrapped about the belt edges and fastened to the spiral link belt.

The fabric forming the protective cover may be a single or double-layer fabric. Preferably it is composed of two layers of transversely extending wires arranged in pairs one above the other and interwoven with a system of longitudinally extending wires. A seven or eight harness weave where the longitudinal threads pass over four or five pairs of transverse threads is especially advantageous. Thus a pronounced longitudinal structure is formed which facilitates sliding of the spiral link belt past the stationary machine parts when coming in contact with them. The protective cover has a continous uniform longitudinal structure on the top side as well as on the underside and edge portion.

The fabric of the protective cover is preferably made of polyester monofilament. Both the longitudinal wires and the transverse wires preferably consist of a wire type of very low elastic modulus, as used, for example, for transverse threads of sheet forming fabrics. This enables the protective cover to follow the elongation of the spiral link belt normally occurring during operation.

Care should be taken with the selection of the material and the type of weaving of the protective cover that no substantial differences in elongation and shrinkage are created between the spiral link belt and the protective cover stitched thereon. It has to be taken into consideration in this connection that dryer belts are heated up 160° C. However, the spiral link belt can also be manufactured from other hydrolysis resistant synthetic resin wires, e.g. from polyamide or polypropylene wires.

The protective cover is advantageously produced on ribbon looms. The protective cover can be secured to the screen margin by stitching, and the longitudinal structure of the external surface of the protective cover makes it possible to place the sewing thread into the groove between two longitudinal wires on the external surface of the protective cover. Furthermore, it is possible to omit individual or several adjacent longitudinal wires at regular intervals in the fabric structure of the protective cover and to place the sewing thread into the deep grooves so formed. These longitudinal wires can be omitted during the weaving operation, or they can be removed after the heat setting. The longitudinal wires are removed at the same site on the top and bottom side of the protective cover so that with an industrial sewing machine an extaordinarily durable connection can be made. The attachment of the protective cover to the spiral link belt several centimeters inwardly of the edges, rather than at the edges themselves, prevents the seam from chafing along the machine parts and thus from being exposed to increased wear. The protective cover should be laid as close as possible around the belt edges.

It is possible to fill and pasteup the spiral link belt in the marginal region in a manner known per se with a synthetic resin composition in order to further prolong the service life of the spiral link belt. It is usually sufficient when the belt edges are filled over a width of 25 to 30 mm.

The pasted region is substantially less wide than the protective cover so that the protective cover shields the resin composition against contact with the hot surfaces of the drying cylinders and the resin composition embrittles more slowly and is not subject to rapid aging.

The advantages attainable by the invention especially reside in the fact that the edge of the spiral link belt is protected by the protective cover against wear and destruction by the stationary machine parts and that the spiral link belt is exposed to less heat along the margins. This is significant, because the marginal regions of a spiral link belt are disposed beyond the protecting paper sheet and are thus exposed to higher temperatures than the central region of the belt. While normally spiral link belts are manufactured from the relatively heat sensitive polyester material because other synthetic resins are less suitable for being wound into helical form, the woven protective cover can be made of material more resistant to heat e.g. polypropylene. The protective cover also shield the marginal regions of the spiral link belt against direct contact with the hot surfaces of the drying cylinders.

The air permeability of the spiral link belt in the marginal region can be reduced, as required, by the attached protective cover. To this end the protective cover can be woven with differential warp density, e.g. in such a way that the warp density is especially high along the edge, while it gradually decreases toward the middle of the spiral link belt.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
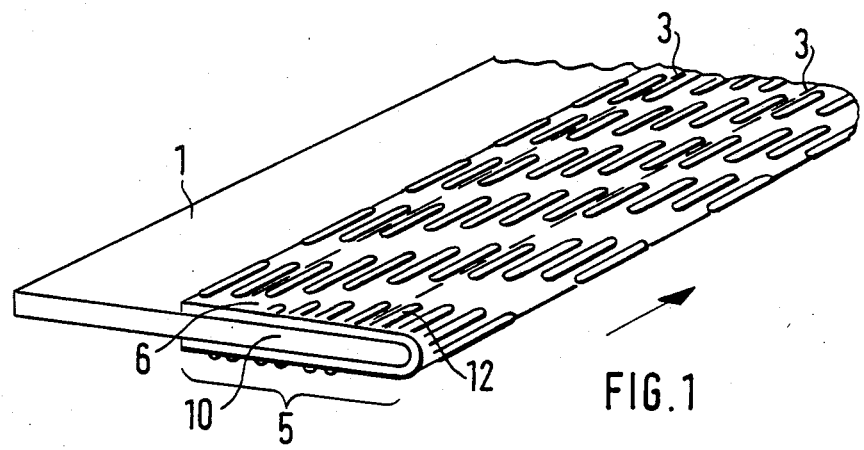
FIG. 1 is a perspective view of the marginal region of a spiral link belt with attached protective cover.

FIG. 1 schematically illustrates a spiral link belt 1 on the edge 5 of which a protective cover 6 is placed. The spiral link belt may be of the type described in German Offenlegungsschrift No. 3,039,873, so that its structure is not shown in detail. The arrow in FIG. 1 indicates the running or longitudinal direction of the spiral link belt. The protective cover 6 is wrapped about the edge 5 of the spiral link belt 1 so that the marginal region of the spiral link belt 1 is covered on the top side and on the bottom side by the protective cover 6. The protective cover 6 is attached by a seam 3 passing through the spiral link belt 1 and connecting the faces of the protective cover 6 disposed on the top and on the bottom side. The protective cover 6 can also be pasted or adhesively secured to the margin of the spiral link belt 1.

Figure 2:
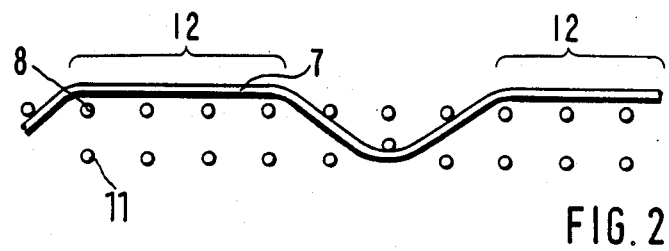
FIGS. 2 and 3 illustrate the course of the longitudinal threads in a seven and eight harness weave of the protective cover fabric.
Figure 3:
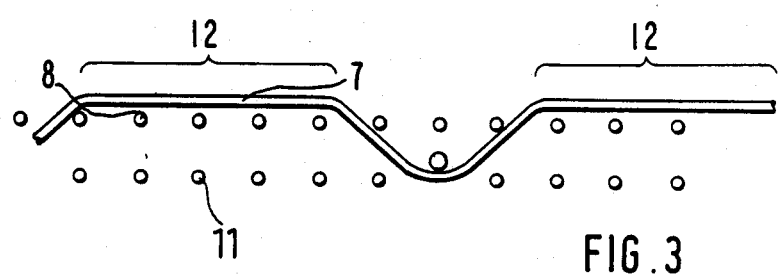

FIGS. 2 and 3 show in longitudinal section the course of the longitudinal wires of the fabric of the protective cover 6. The longitudinal wires 7 pass over four or five transverse wires 8 of the upper layer and then pass around a transverse wire 11 of the lower layer. This leaves long floatings 12 on the side which extend longitudinally on the external side of the protective cover 6 and facilitate sliding of the edge of the spiral link belt past the stationary machine parts.

Figure 4:
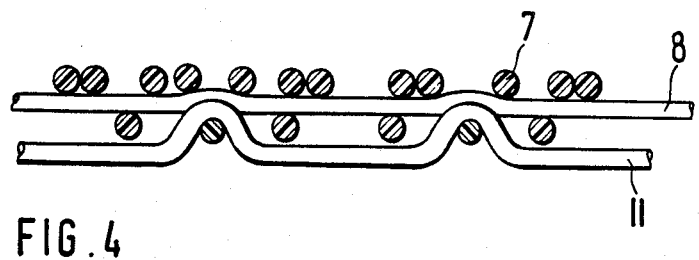
FIG. 4 shows the course of the transverse wires in a weave as illustrated in FIG. 3.

FIG. 4 shows a section across the fabric of FIG. 3. Here too, it is apparent that the longitudinal wires 7 form the external surface, i.e., the top side in FIG. 4.

Figure 5:
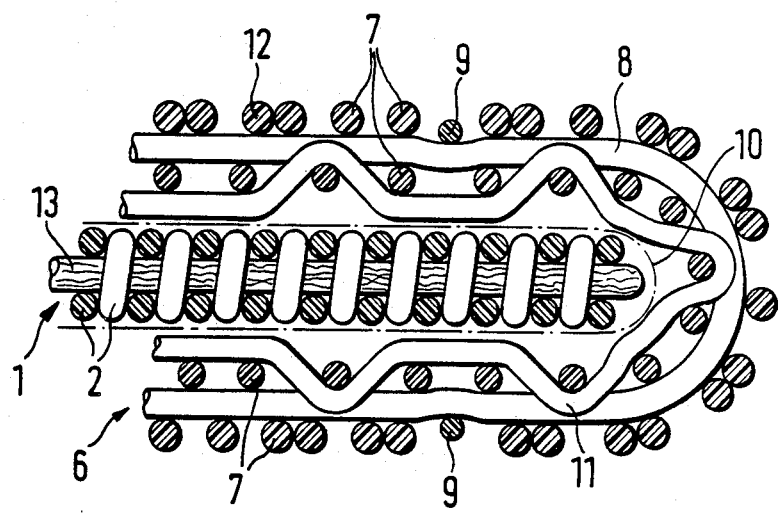
FIG. 5 shows a section through the marginal region of a spiral link belt in cross machine direction.

FIG. 5 shows a section across the fabric of the protective cover 6 in which a longitudinal wire 7 has been replaced by a sewing thread 9. The sewing thread 9 is somewhat thinner than the longitudinal wires 7. The sewing thread 9 fastens the protective cover 6 to the spiral link belt and is pulled deeper into the fabric so that it is hidden in the fabric and largely protected against abrasion.

Futhermore, FIG. 5 shows the marginal region of the spiral link belt in which the synthetic resin composition 10 is located for additionally protecting the filling material 13 to prevent projecting ends of the filling material 13 from getting caught by the stationary machine parts.

EXAMPLE

The spiral link belt consists of helices having seven windings per centimeter and wound from polyester monofilament of 0.7 mm diameter. The polyester is resistant to hydrolysis. The pintle wires consist of hydrolysis resistant polyester monofilament of 0.9 mm diameter. The pintle wires are spaced apart 5 mm in the spiral link belt.

The fabric of the protective cover has an eight harness double layer structure with a course of the warp as illustrated in FIG. 3. The structure is distributed in satin weave with a counter of three. The fabric is woven from thirty warp threads per centimeter with 0.32 mm diameter and 2×12 weft wires per centimeter of 0.32 mm diameter each. The warp extends in the longitudinal direction and the warp wires and weft wires consist of the wire type known by the trade name "Trevira 900 C" which is resistant to hydrolysis and readily extensible and which is normally used only as weft wire for papermachine screens.

The fabric for the protective cover is heat, set at a high temperature but in the absence of tension, so that it does not elongated during setting. Therefore shrinkage of the fabric is avoided when it heats up in the drying section. The fabric of the protective cover is readily extensible and elongates together with the spiral link belt during use. The spiral link belt is also thermoset in the conventional way. Thereafter the protective cover is stitched on the top and bottom side over a width of 12 cm to the edge of the finished spiral link belt to which end four warp wires each distributed over the upper and the lower side of the protective cover were omitted during weaving. The endless spiral link belt is stretched between two rollers of the finishing machine and is slowly moved in a longitudinal direction during stitching. Edge sensors insure that the seam extends precisely along the groove left by the omitted warp wires. The seam track is supervised on the top and bottom sides of the spiral link belt by video cameras to enable the operator of the sewing machine to observe the proper course of the seam threads on two monitor screens with large magnification and to correct it if required.

The protective cover can cover the spiral link belt on the top and the bottom side even over different widths, for example, over a width of 40 cm on the paper side and over a width of 8 cm on the other side. The protective cover then extends up to within the width of the paper web and influences the drying process of the paper web. The greater width of the protective cover can also be on the reverse side and the smaller width on the paper side. While the invention has been particularly shown and described with reference to preferred embodiments thereof it will be understood by those in the art that the foregoing and other changes in form and details may be made therein without departing from the spirit and scope of the invention.

What is claimed is:

1. A spiral link belt for the production of paper comprising a multiplicity of mutually parallel helices with the windings of successive helices intermeshing in the manner of a zipper to define channels, pintle wires disposed in the channels formed by the meshing windings, and protective cover means comprising a double-layer woven fabric strip wrapped about each belt edge and fastened to the spiral link belt, said protective cover means having a continuous uniform longitudinal structure on opposite surfaces of the belt and along the edge of the belt.

2. A spiral link belt according to claim 1 wherein the fabric of the protective cover is comprised of a seven or eight harness weave in which the longitudinal threads pass over four or five pairs of transverse threads, respectively.

3. A spiral link belt according to claim 2 wherein the fabric of the protective cover is formed from low elastic modulus polyester monofilament.

4. A spiral link belt according to claim 1 wherein the protective cover is stitched to the belt edge with a sewing thread extending in the longitudinal direction of the spiral link belt and being disposed in a vacant space left by omission of one or more adjacent longitudinal threads in the fabric of the protective cover.

5. A spiral link belt according to claim 1 wherein the interior of the spirals in the region of the edges is filled with a synthetic resin composition.

* * * * *